(12) United States Patent
Johnston

(10) Patent No.: US 6,409,177 B1
(45) Date of Patent: Jun. 25, 2002

(54) ROTARY SHAFT SEAL

(75) Inventor: David E. Johnston, East Hebron, NH (US)

(73) Assignee: Freudenberg-Nok General Partnership, Plymouth, MI (US)

( * ) Notice: Subject to any disclaimer, the term of this patent is extended or adjusted under 35 U.S.C. 154(b) by 0 days.

(21) Appl. No.: 09/583,840

(22) Filed: May 31, 2000

Related U.S. Application Data
(60) Provisional application No. 60/150,273, filed on Aug. 23, 1999.

(51) Int. Cl.[7] ................................. F16J 15/32
(52) U.S. Cl. ................ 277/551; 277/559; 277/560; 277/572
(58) Field of Search .............. 277/551, 559, 277/560, 572, 576, 577, 332, 583

(56) References Cited

U.S. PATENT DOCUMENTS

| | | | | |
|---|---|---|---|---|
| 2,872,229 A | * | 2/1959 | Waser | |
| 2,945,665 A | * | 7/1960 | Regan et al. | |
| 3,352,563 A | * | 11/1967 | Flair | |
| 3,929,340 A | * | 12/1975 | Peisker | |
| 3,984,113 A | * | 10/1976 | Bentley | |
| 4,040,636 A | * | 8/1977 | Albertson et al. | |
| 4,118,856 A | * | 10/1978 | Bainard et al. | 29/511 |
| 4,212,476 A | * | 7/1980 | Kawabata et al. | |
| 4,334,687 A | | 6/1982 | Holzer et al. | |
| 4,358,085 A | * | 11/1982 | Regan et al. | |
| 4,427,205 A | | 1/1984 | Holzer et al. | |
| 4,739,998 A | * | 4/1988 | Steusloff et al. | |
| 5,100,158 A | | 3/1992 | Gardner | |
| 5,190,299 A | * | 3/1993 | Johnston | |
| 5,427,387 A | * | 6/1995 | Johnston | |

* cited by examiner

*Primary Examiner*—Anthony Knight
*Assistant Examiner*—Alison K. Pickard
(74) *Attorney, Agent, or Firm*—A. Michael Tucker; Casimir R. Kiczek

(57) ABSTRACT

A radial shaft seal with a membrane is disclosed. The surface of the membrane is in sealing contact with the shaft. A plurality of inclined waves are formed in the surface in response to shear stresses formed by movement of one of the support rings relative to the other. The inclined waves are generally elliptical in shape and form an undulating surface. The direction of the inclined waves can be changed in response to shaft rotation.

39 Claims, 3 Drawing Sheets

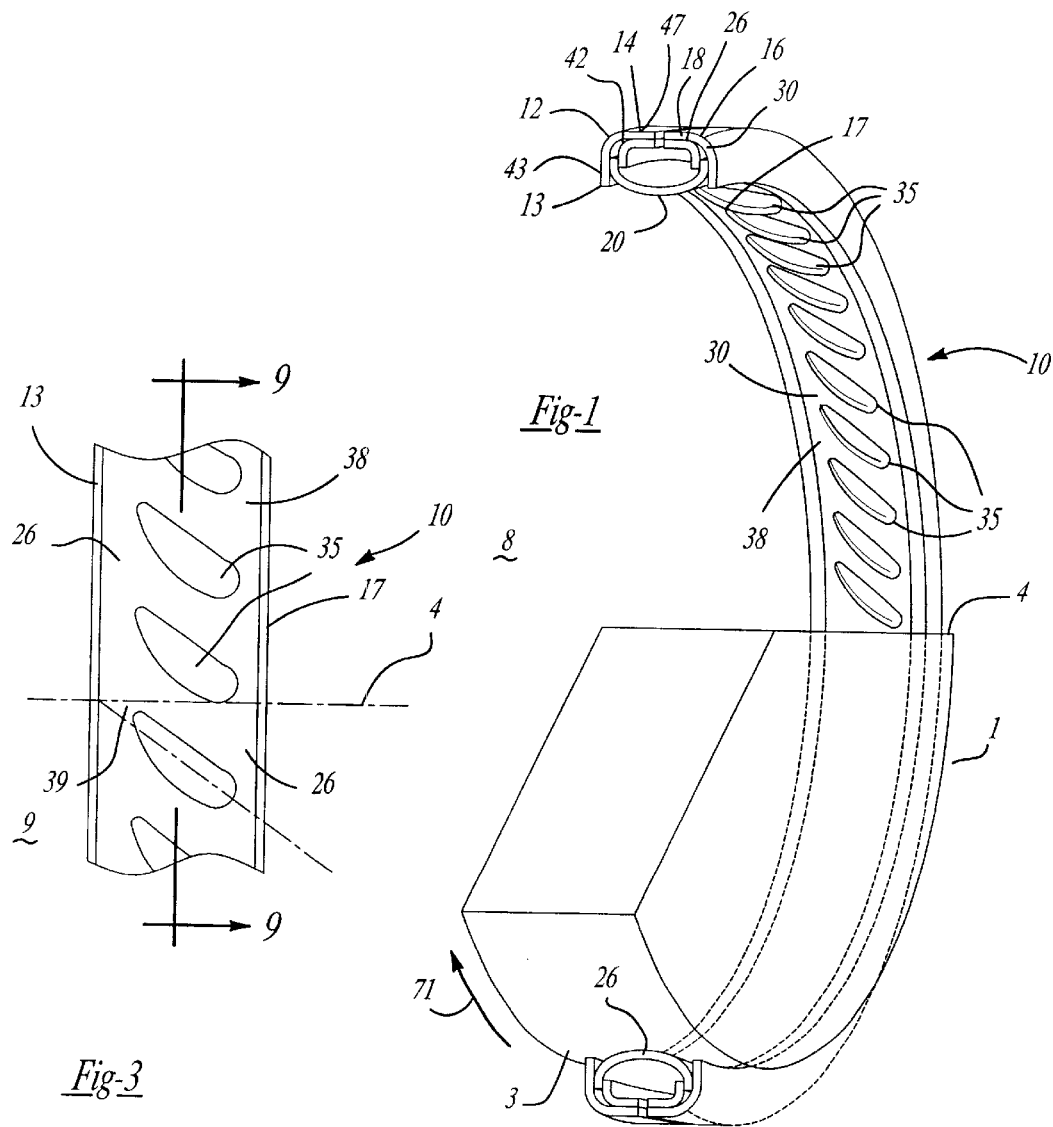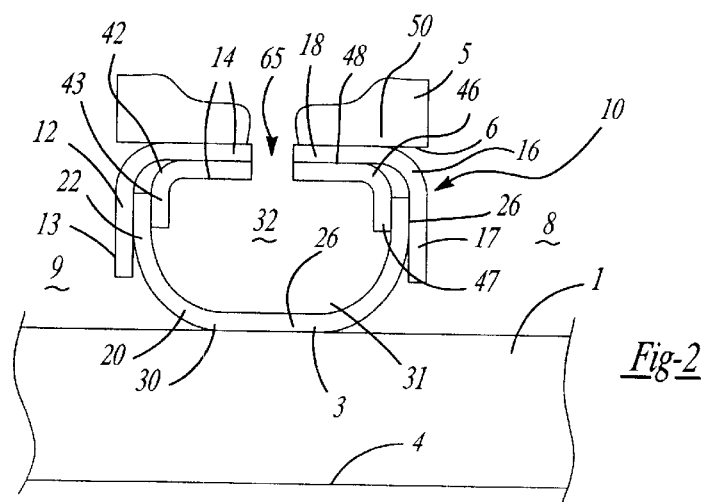

ROTARY SHAFT SEAL

This application claims the benefit of provisional application 60/150,273 filed Aug. 23, 1999.

BACKGROUND OF THE INVENTION

The present invention relates generally to fluid seals, and more particularly to shaft seals having a membrane sealing surface which provides pumping action in both directions of shaft rotation.

Conventional oil seals include a rigid casing portion and an elastomeric sealing lip. The primary lip is comprised of a pair of frusto-conical surfaces, "oil" and "air" side surfaces, which meet along a sealing band to retain lubricant within the sealed region. In common practice, the angle between the shaft being sealed and the oil side surface is a steeper angle or of higher numerical degree than is the angle between the air side lip and the shaft being sealed. This arrangement has customarily provided satisfactory sealing in a number of applications, including a certain inherent amount of seal "pumping" effect.

A "pumping" seal is one wherein rotation of the sealed part relative to the seal creates a hydrodynamic action in the sealed fluid at the interface between the seal and the relatively rotatable sealed part. The purpose of this action is primarily to ensure against dynamic leakage and further, to ensure that whatever small amount of fluid that may escape the sealed region is pumped back by this hydrodynamic action into the sealed area.

The primary lips of "pumping" seals are generally formed of solid elastomeric materials such as polyacrylate, fluorocarbon, silicone, nitrile, hydrogenated nitrile, ethylene-acrylate and other similar materials. The seal employs a garter spring to secure a tight fit over the shaft. The garter spring assures an interference of the inner diameter of the primary lip with the shaft wear surface on its outer diameter so that the seal will closely surround the shaft for an extended period of time. The primary lip needs to be stretched to fit onto the shaft in order to ensure effective sealing. Sometimes this can present problems during the installation and wear-in procedure. Additionally, the primary lip seal is difficult to make for bidirectional applications and is not adjustable to varying application conditions.

Thus, there is a need for a primary lip seal with low friction that is flexible, is able to follow the eccentricities in the shaft, has a pumping feature which is able to accommodate pumping action in both directions of shaft rotation, and has the ability to adjust tension in the shaft surface so that the seal can perform properly and yet meet varying application conditions.

SUMMARY OF THE INVENTION

The present invention is directed to a rotary shaft seal including a membrane attached to a pair of support rings around a shaft. One of the support rings is adjacent to the other of the support rings. The membrane has a surface in sealing contact with the shaft. A plurality of waves are formed in the surface in response to movement of one of the pair of support rings relative to the other of the pair of support rings to form a pumping spiral whereby any fluid migrating along the shaft is pumped back to the oil side of the seal.

It is an object of the present invention to provide a shaft seal with a membrane which is attached to a pair of spaced apart rings which can be twisted relative to each other so as to form inclined waves on the surface of the membrane in sealing contact with the shaft.

It is another object of the present invention to form inclined waves on the surface of a membrane shaft seal by shear action to form a pumping spiral so that any fluid migrating along the shaft is pumped back to the oil side of the seal.

It is still another object of the present invention to twist a pair of spaced apart support members so that relative movement of one to the other of the pair of support members is induced by friction between the shaft and the sealing surface.

It is another object of the present invention to twist a pair of spaced apart support rings so that relative movement of one to the other of the pair of support members is implemented by an external signal so as to form inclined waves on the surface of the membrane.

It is still another object of the present invention to change the direction of the inclined waves of the surface of the membrane in response to shaft rotation.

It is still a further object of the present invention to provide a low friction shaft seal that permits the use of a wide variety of materials to form the membrane and yet retains the required flexibility to sealingly contact the shaft.

These and other objects and features of the invention will become apparent from the description and especially taken in conjunction with the accompanying drawings illustrating the invention and a preferred embodiment.

BRIEF DESCRIPTION OF THE DRAWINGS

The various advantages of the present invention will become apparent to one skilled in the art upon reading the following specification and by reference to the drawings which include:

FIG. 1 is a partial perspective view of a rotary shaft seal according to the invention, mounted on a shaft;

FIG. 2 is a partial cross sectional view of the rotary shaft seal;

FIG. 3 is partial cross sectional view of the rotary shaft seal surface;

DETAILED DESCRIPTION OF THE PREFERRED EMBODIMENT

Figure 4:
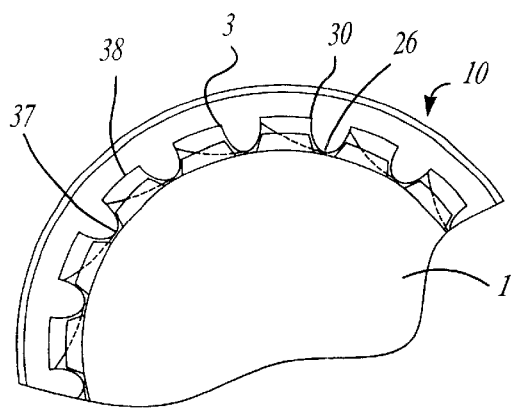
FIG. 4 is a an view of the rotary shaft seal.

The following description of the preferred embodiment is merely exemplary in nature and is in no way intended to limit the invention or its applications or uses.

Those skilled in the art will recognize that the principles of the invention as will be disclosed herein may be applied to a number of different types of lubricating fluids, including but not limited to oil, grease or any other fluids used for lubrication purposes and that the invention applies equally to seals wherein the sealing contact is urged either radially inwardly or outwardly into sealing contact with the shaft or the other element to be sealed. For purposes of illustration, the oil seal or radial shaft seal which will be described, has a sealing surface which is urged by a radially inwardly directed force into sealing engagement with a rotatable shaft passing axially therethrough.

The expression "sealing surface" means the portion of the membrane where the surface of the membrane meets and actually engages the shaft of the other member, although it will be understood that, properly speaking, this region may be one of little contact between the shaft and the surface of the membrane because these parts are separated by a thin layer of oil or other fluid lying between the shaft and the seal. The behavior of the lubricating fluid will vary depending on the type of fluid used, temperature environment and its viscosity characteristics. A membrane is defined as a flexible and thin sheet of uniform elastomeric material. In practical applications, the membrane thickness will vary relative to its diameter and width, also the membrane material properties, and to some extent, the seal operating conditions. For example, depending on the size and the material, the thickness for a seal can be from 0.1 to 0.25 mm, 0.25 to 0.5 mm, 0.5 to 0.75 mm, 0.75 to 1.00 mm, and 1.0 to 1.5 mm. The thickness of the membrane is preferably 0.25 mm. However, those skilled in the art will recognize that the thickness depends on the ratio of the allowable bending stiffness to the tensile stiffness, the diameter of the seal, and the width of the membrane. Thus, the thickness ranges listed above are not to be considered as a limitation to the thickness which can be used to practice the present invention but the invention incorporates all thickness ranges for the membrane within the spirit and scope of the invention.

It will also be understood that a membrane is a structure which, except under very special conditions, will not sustain compressive stresses and which theoretically has no resistance to bending forces. In practice, some bending stiffness is unavoidable because the membrane has a finite thickness. The case of a flat membrane whose length is much greater than the width and in which a small shear displacement is applied to the long sides will provide a relevant example which is described below.

Shear displacement induces principal stresses at approximately 45° to the original length or longitudinal axis and width or transverse axis of the membrane. These stresses are of equal magnitude but of opposite sign, that is tensile and compression. When the membrane remains perfectly flat, the induced principal stresses will be maintained since there are no bending moments and all of the forces remain in the original plane. This is a state of unstable equilibrium which can be disrupted by a small local disturbance or deflection to the membrane substantially perpendicular to its original plane. The disturbance in conjunction with the compressive principal stress imposes a local bending moment on the membrane which it fundamentally cannot sustain, and causes a re-distribution of the stress field. In this new stress field, the original compressive principal stress collapses to zero, while the original tensile principal stress changes its value. Referring the new principal stresses to ones in the length and width coordinates, it is found that the original simple shear stress, arising from the shear displacement on the long sides, is replaced by tensile stresses and a different shear stress. The change from unstable to stable equilibrium causes a series of waves or undulations in the membrane which are perpendicular to the original plane. The angle of the waves is dependent on the relative values of the new tensile stresses.

In going from the flat condition to the undulated condition, the membrane dissipates energy. If the flat membrane is initially subject to tensile stresses in the original axes as well as shear, the waves can also be formed, provided the combination of the stresses will produce a compressive principal stress. In the absence of a compressive principal stress, the membrane will be in stable equilibrium and not form waves.

It can be understood that if the membrane has any curvature to it in the initial state this is equivalent to a disturbance from the flat, and the shear deflection, when gradually applied, will immediately start to form undulations. Referring now to the drawings in greater detail, FIG. 1 shows the membrane seal according to the invention as it is typically embodied in a radially inwardly acting shaft seal assembly generally designated at 10. As shown in FIG. 2, the shaft seal 10 is inserted into the bore 6 of housing 5 into which a relatively rotatable shaft 1 with a longitudinal axis 4 with wear surface 3 passes through the bore 6. The oil side 9 is on the left hand side of the shaft seal assembly 10 and air side 8 is on the right hand side of the shaft seal assembly 10 of the illustrated figures.

As shown in FIGS. 1 and 2, the seal 10 includes an exterior, annular outer first casing portion 12 which has a generally radially extending offset flange 13 and a generally axially extending flange 14. The shaft seal assembly also includes an exterior, annular, outer second outer casing portion 16 which has a radially extending offset flange 17 and a generally axially extending flange 18 and is spaced apart from the first outer casing portion 12.

A membrane or diaphragm 20 may be firmly secured at its circumferential edges by bonding, clamping, bolting, crimping, or riveting to the first outer casing portion 12 and the second outer casing portion 16. The diaphragm is a flexible member constrained around its periphery and capable of movement substantially at right angles to these planes of restraint. The membrane 20 is normally made of an elastomeric material previously described herein and may alternatively include natural rubber, SBR, fluorosilicone, isoprene, butyl rubber, PTFE, perfluoromaterials, EPDM, epichlorohydrin, chloroprene, polyacrylate, ethylene acrylate, thermoplastic elastomers and any other similar materials suitable for the application. The elastomeric materials may be optionally reinforced with such materials as cotton, rayon, glass fiber, carbon fiber, PTFE or other similar materials which are also suitable for practicing the invention. Reinforcement of the membrane may be necessary in order to obtain wear resistance, strength, modulus, and reduced friction at the sealing surface or other similar characteristics depending on the application requirements of the seal.

Preferably, the membrane 20 is held by one edge against the first outer casing portion 12 and the other edge against the second outer casing portion 16. The first peripheral leg 22 of the membrane 20 is sandwiched between the first outer casing portion 12 and a first inner case member 42. As stated earlier, other methods than those described may be used for securing the membrane 20 to the first outer casing portion 12 and the second outer casing portion 16 or any other securing method which suitable for practicing the invention may be employed. The inner case member 42 has a radially extending flange 43 and an axially extending flange 44. Similarly, the second peripheral leg 22' of the membrane 20 is sandwiched between the second outer casing portion 16 and the second inner membrane case 46. The case 46 has a radially extending flange 47 and an axially extending flange 48. The membrane 20 extends from the first outer and inner cases 12, 42 respectively, to the second outer and inner cases 16, 46 respectively, so as to form a surface 30 with an axial length 26' of surface 26 which is in contact with the wear surface 3 of the shaft 1.

Figure 9:
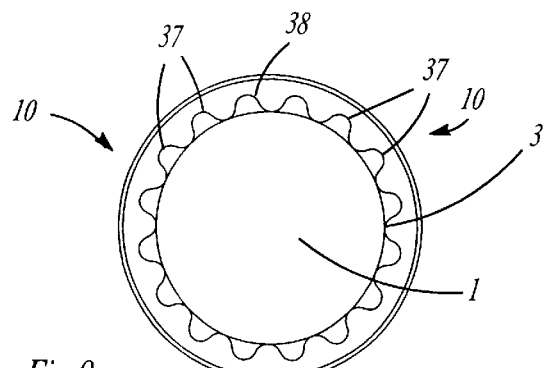
FIG. 9 is a cross sectional view of along 9—9 of FIG. 3.

The axial spacing of the first outer case portion 12 to the second outer case 16 is sized so as to provide a slightly longer axial length then the supported portion of the membrane 20. This permits the axial length 26' of the surface 26 of the membrane 20 to be in positive sealing contact with the wear surface 3. As stated earlier, the membrane 20 is subjected to a number of different forces acting in the membrane. As a result of these forces, the surface 30 forms a plurality of undulations 37 which form an undulating surface 38. The undulating surface 38 is in the form of inclined waves 35 which are generally elongated ellipsis in shape and extend along substantially the entire axial length 26' of the seal surface 26 and produce a dynamic seal during the rotation of the shaft 1. It should be noted that the waves 35 are not simply a function of the shear displacement but a complex reaction to the imposed force and/or the displacement boundary conditions. Wave amplitude, length, shape and angle will depend on these boundary conditions on the membrane 20 but in a complex manner. The angle 39 of the waves primarily depends on the stress distribution in the membrane 20 after perturbation. The angle 39 may be in the range of 20° to 70° but preferably it is in the range of 40° to 50°, as shown in FIG. 3. The elliptical shape of the waves is a result of the radial and axial clamping at the edges of the membrane and is not a deliberate feature of the design. The undulations 37 have an apex and a nadir to provide a forwarding or pumping action toward the oil side 9 of the shaft seal 10, as shown in FIGS. 4 and 9 and will have an amplitude that is larger in the center of the membrane 20 than near the edges of the elliptical shape. The undulating surface 38 varies in axial length from a substantially narrow wedge shape facing the oil side 9 to a relatively wider shape facing the air side 8 in a generally elongated elliptical shape at an angle 36 with the axis 4.

In the prior art, rotary shaft seals with undulations are based on linear displacement which have a consistent rise and fall rate. Undulations of this type are described in U.S. Pat. No. 5,190,299, the disclosure of which is hereby incorporated by reference.

Figure 5:
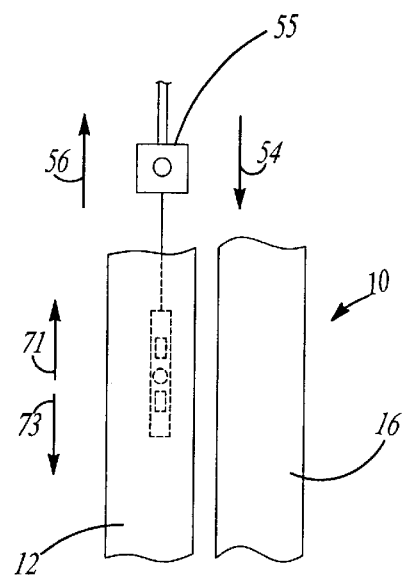
FIG. 5 is a partial top view of the rotary shaft seal.

On the contrary, the present invention permits the undulations to vary according to the forces acting on the surface 30. Tension 36 is varied by inducing relative movement of the first outer casing portion 12 relative to the second outer casing portion 16 such as by an actuation member 55, as shown in FIG. 5. When the shaft direction 71 is in the counterclockwise direction, the outer casing 12 is moved in direction 54 and the angle of inclination 39 relative to the longitudinal axis 4 is shown in FIG. 3. However, when the shaft direction is in a counter rotational direction 73, the outer casing 12 is moved in direction 56 and the angle inclination of the membrane relative to longitudinal axis 4 adjusts accordingly.

Figure 6:
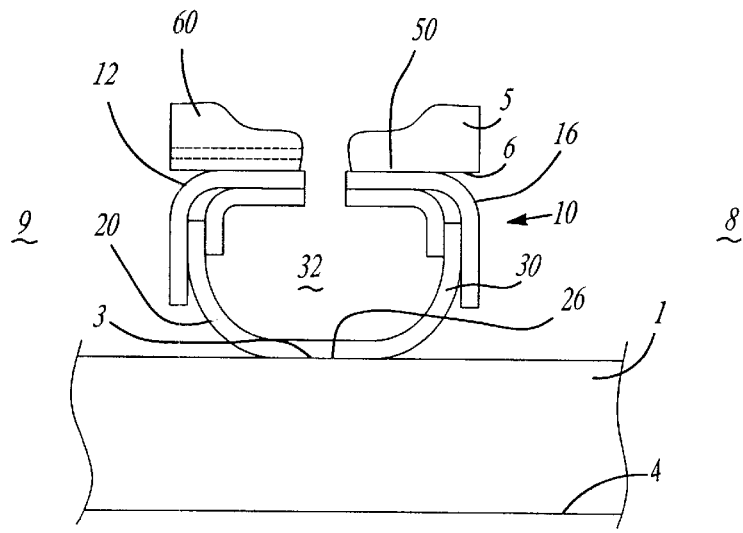
FIG. 6 is a partial cross sectional view of an alternate embodiment of the invention.

By introducing a pressure source 65 into the cavity 32 formed behind the surface 30 of the membrane 20, as shown in FIG. 2, a hydraulic force is generated which presses surface 30 against the wear surface 3. The cavity 32 is formed by the inner surface 31 of the membrane 20 and the inner surfaces of the first membrane casing 32 and the second membrane casing 46, as shown in FIGS. 2, 6, 7 and 8. Those skilled in the art will recognize that it is possible to pressurize the cavity 32 by drilling a vent hole 60 in the housing 5, as shown in FIG. 6, and sealing the air side of the outer casing portion 16 against the fore 6 and sealing the edges of the membrane 20 against the inside surface of the portion 16 by conventional sealing techniques. The vent hole communicates between the oil side 9 of the seal 10 and the cavity 32 in the membrane 20. Optionally, it may not be necessary to pressurize the cavity 32 and in such situations the cavity 32 is permitted to be at atmospheric pressure or at whatever pressure is generated in the cavity 32 during operation of the seal 10.

Figure 7:
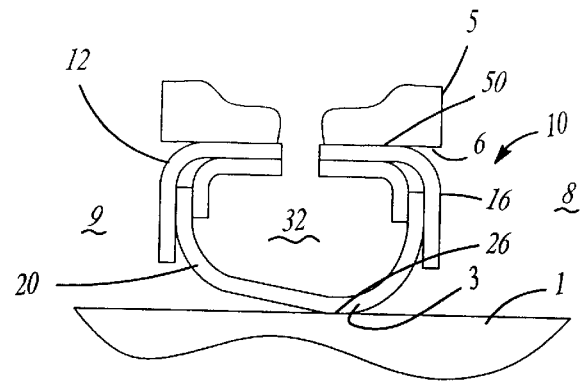
FIG. 7 is a partial cross sectional view of the rotary shaft seal surface through a radially undulating portion of the seal showing the wave surface in contact with the shaft.
Figure 8:
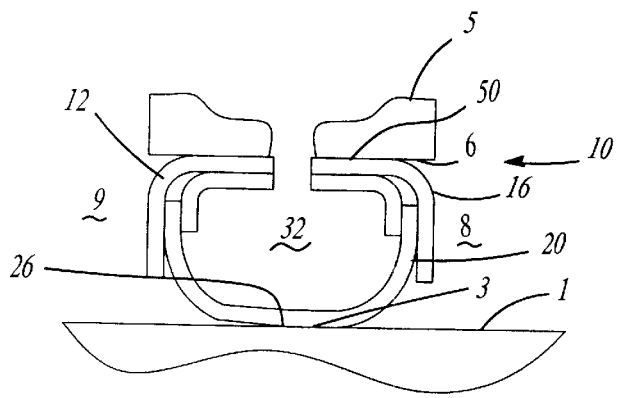
FIG. 8 is a partial cross sectional view of the rotary shaft seal surface through a portion of the seal that is not undulated.

As shown in FIGS. 4, 7 and 8, the surface 30 can undulate along the circumference of the shaft 1. The surface 30 can undulate sinusoidally or in any other similar wave form manner along its circumference. The shape of the inclined waves 35 along the sine curve will generate forwarding actions to pump fluid along the shaft 1 back to the oil side 9. The shape of the waves 35 differ in strength in different areas of the axial seal surface 26. Because of this wave action, the sinusoidal wave formed on the axial seal surface 26 of the seal 10 is especially adaptable to various viscosities of fluid media being sealed.

Tension 36 on the membrane 20 occurs by twisting the first outer casing portion 12 which faces the oil side 9 relative to the second outer casing portion 16 which faces the air side 8 and may be optionally sealed as discussed above. This is accomplished by attaching an actuation member 55 to the first outer casing portion 12. It is important to seal the casing portion that faces the air side 8 with a static seal 50 in order to prevent any lubrication from the oil side from migrating out to the air side of the seal. See FIGS. 2, 6, 7 and 8. The oil side 9 of the seal 10 however, is not sealed against the housing 5 so as to permit relative movement of the outer casing portion 12 relative to the bore 6 in the housing 5 and in order to promote tension in the membrane 20. The static seal 50 is formed by overmolding a layer of elastomeric material onto the outer peripheral surface of the second outer casing portion 16, or spraying, coating or dispensing a layer of elastomeric material onto the other portion 16, as is well known in the art. The static seal 50 presses against the bore 6 to seal the portion 16.

Although the preferred embodiment permits circumferential movement of one clamped edge of the membrane relative to the other, the membrane can also be substantially weakened on the oil side 9, such that the frictional force from the contact of the seal surface 26 against the rotating wear surface 3 will cause greater circumferential deflection there. This relative movement induces the desired conditions in the membrane 20 for wave production. Thus, the first casing portion need not be rotatable relative to the outer clamp.

With the seal 10 installed in the housing 5, the membrane 20 may be in contact with the shaft 1 or it may have a clearance gap. With the former, friction or an external device can be used to apply shear to the membrane 20 but with the latter (that is with clearance gap), only external devices are effective. To ensure static sealing of the seal surface 26 against the wear surface 3, contact of the membrane 20 on the shaft wear surface 3 is essential.

As stated earlier, the lubricant or fluid is located in the oil side 9 of the shaft seal assembly 10. When the shaft 1 rotates, the lubricant has a tendency to migrate toward the air side 8. To prevent this, the membrane 20 of the seal 10 produces waves which form undulations 37 and which in turn creates a pumping action. The undulations 37 are formed at the zone of contact on surface 26 which is in contact with the wear surface 3 of the shaft 1 or in an area of close proximity to the shaft 1 as in the case of a clearance gap. As the fluid migrates toward the air side 8, the fluid encounters the inclined waves 35 which are so angled by the undulations 37 that the fluid is transferred back toward the oil side 9.

Depending on the operating conditions, the waves 35 may not remain stationary but may move around the circumference in the direction of shaft rotation. The movement of the waves 35 could enhance the pumping action and could reduce the surface friction of the membrane 20 on the shaft 1.

As stated earlier, the extent of the pumping action depends on the angle of inclination 39 in the waves 35 relative to the longitudinal axis 4, their amplitude and number and the friction of the membrane 20 against the wear surface 3. The pumping action generated by the seal 10 moves back any liquid that migrates along the shaft 1 into the space between the wear surface 3 and the membrane axial seal surface 26. Thus, it is advantageous to have no gap between the wear surface 3 of the shaft 1 and the axial seal surface 26 in order to prevent fluid from leaking out even when the shaft 1 is at rest. The ability to adjust tension 36 on the surface 30 of the membrane 20 is also advantageous in order for the seal 10 to meet various application conditions, such as pressure, fluid, speed, and temperature conditions.

While only one embodiment of the present invention has been described, it will be apparent that for the present invention, in light of the disclosure set forth above, various changes and modifications may be made without departing from the spirit and scope of the invention.

What I claim is:

1. A shaft seal for sealing fluid about a shaft, said shaft seal comprising:
    a first support member;
    a second support member adjacent to but spaced away from said first support member;
    a membrane attached to each of said first and second support members, said membrane having a surface adjacent to the shaft; and
    a plurality of waves formed on said surface in response to movement of said first support member relative to said second support member, said plurality of waves forming a pumping spiral to pump back any migrating fluid along the shaft.

2. A shaft seal as claimed in claim 1 wherein said membrane includes a first leg, a second leg opposite said first leg, and a portion forming a cavity between said first and second legs.

3. A shaft seal as claimed in claim 2 wherein said cavity is filled with a fluid.

4. A shaft seal as claimed in claim 2 wherein said cavity is pressurized.

5. A shaft seal as claimed in claim 1 wherein said membrane in tensioned axially.

6. A shaft seal as claimed in claim 1 wherein said membrane is tensioned circumferentially.

7. A shaft seal as claimed in claim 1 wherein one of said support members is twisted relative to the other of said support members.

8. A shaft seal as claimed in claim 1 wherein relative movement of the waves is induced mechanically.

9. A shaft seal as claimed in claim 1 wherein said waves form an undulating surface in contact with the shaft.

10. A shaft seal as claimed in claim 1 wherein said waves have an angle of inclination relative to a longitudinal axis of the shaft.

11. A shaft seal as claimed in claim 1 further comprising:
    an actuation member on said first support member.

12. A shaft seal as claimed in claim in claim 11 wherein said actuation member moving said first support member relative to said second support member.

13. A shaft seal as claimed in claim 1 wherein said plurality of waves having an amplitude, said amplitude forming undulations on the surface of the shaft.

14. A shaft seal as claimed in claim 13 wherein said undulations vary relative to the longitudinal axis of the shaft.

15. A shaft seal as claimed in claim 1 wherein said plurality of waves having an angle of inclination relative to the longitudinal axis of the shaft, said angle of inclination is between 20 to 70 degrees.

16. A shaft seal as claimed in claim 1 wherein said plurality of waves formed in response to the relative movement of said first support member relation to said second support member.

17. A shaft seal as claimed in claim 1 wherein a gap is formed between said surface of said membrane and a wear surface of the shaft.

18. A shaft seal as claimed in claim 1 wherein said surface is in sealing contact with the shaft.

19. A shaft seal as claimed in claim 1 wherein said plurality of waves having an angle of undulation relative to the longitudinal axis of the shaft, said angle of undulation is between 40 to 50 degrees.

20. A shaft seal as claimed in claim 1 wherein said membrane is made of elastomeric material.

21. A shaft seal as claimed in claim 20 wherein said elastomeric material is a polymer comprising polyacrylate, fluorocarbon, silicone, nitrile, natural rubber hydrogenated nitrile, ethylene-acrylate, EPDM, fluorosilicone, perfluoromaterials, fluorocarbon, isoprene, butyl rubber, SBR, natural rubber, chloroprene, and thermoplastic elastomers.

22. A shaft seal as claimed in claim 20 wherein said elastomeric material is reinforced.

23. A shaft seal as claimed in claim 22 wherein said elastomeric material is reinforced with a material selected from a group comprising cotton, rayon, glass fiber, carbon fiber and PTFE.

24. A shaft seal as claimed in claim 1 wherein said membrane having a thickness between 0.15 mm to 0.5 mm.

25. A shaft seal as claimed in claim 1 wherein said first support member has a pair of support rings.

26. A shaft seal as claimed in claim 1 wherein said second support member has a pair of support rings.

27. A shaft seal as claimed in claim 1 wherein shaft seal is bi-directional and said member forming a first pumping spiral in one direction of rotation to the shaft and a second pumping spiral in the opposite direction of the shaft.

28. A shaft seal as claimed in claim 1 wherein said membrane having a thickness and a circumference, said thickness varying from one point on said circumference to another point on said circumference.

29. A radial seal for sealing a shaft, said shaft extending through an opening, one side of said opening contains lubricant, said radial seal comprising:
    a first support member;
    a second support member in spaced apart relationship with first support member; and
    a membrane extending between said first support member and said second support member, said membrane having a surface in sealing contact with the shaft, said surface being tensioned between said first and second support members by relative movement of said first support member to said second support member, said surface being twisted by the relative movement of said first and second support members to create at least one wave in said surface.

30. A radial seal as claimed in claim 29 wherein said surface of said membrane is tensioned axially and circumferentially about the shaft by the relative movement of said first and second support members.

31. A radial seal as claimed in claim 29 wherein said at least one wave having a nadir and an apex.

32. A radial seal as claimed in claim 29 wherein said at least one wave is inclined relative to said surface of the shaft is formed by twisting said first support member relative to said second support member.

33. A radial seal as claimed in claim 32 wherein said inclined wave creates a pumping spiral.

34. A radial seal as claimed in claim 29 wherein said membrane having portions defining a cavity.

35. A radial seal as claimed in claim 34 wherein said cavity is enclosed and vented to said one side of said opening.

36. A radial seal as claimed in claim 34 wherein said cavity is pressurized.

37. A radial seal as claimed in claim 34 wherein said cavity is unpressurized.

38. A radial seal as claimed 34 wherein said cavity is enclosed and filled with a fluid.

39. A radial seal as claimed in claim 29 wherein the friction on the surface adjacent to said first support member is greater than the friction on the surface adjacent to of said second support member, said first support member moves relative to said second support member.

* * * * *